Patented Jan. 2, 1934

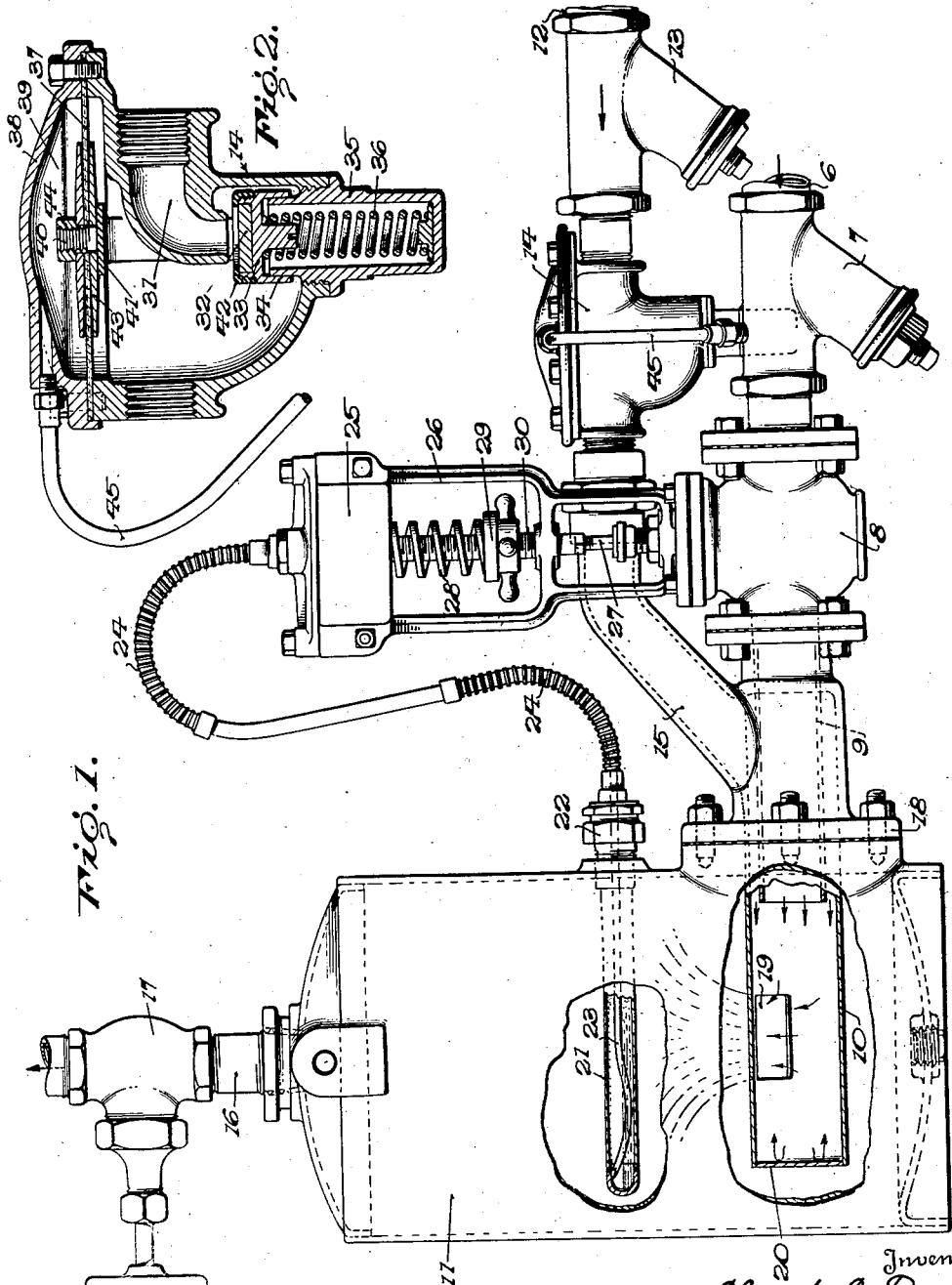

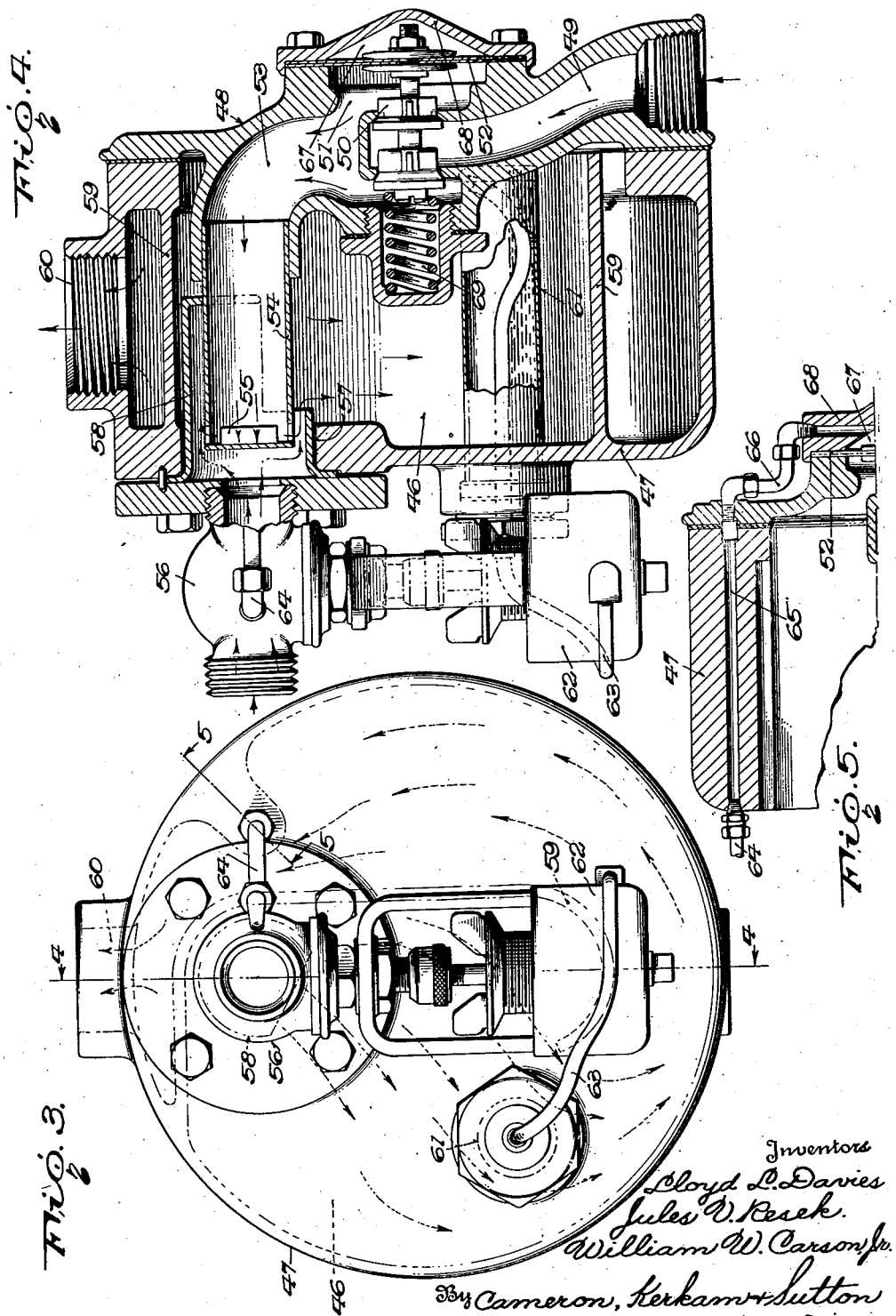

1,942,269

UNITED STATES PATENT OFFICE 1,942,269

FLUID MIXING DEVICE

Lloyd L. Davies, Jules V. Resek, and William W. Carson, Jr., Knoxville, Tenn., assignors to The Fulton Sylphon Company, Knoxville, Tenn., a corporation of Delaware Application March 28, 1932. Serial No. 601,624

12 Claims. (Cl. 236—12)

This invention relates to the art of fluid mixing, and more particularly to a method and apparatus for mixing two or more fluids of different temperatures so as to produce a mixture of said fluids having a substantially constant predetermined temperature.

In devices of this general character, as for example water mixers wherein cold water is mixed with and heated by hot water, steam or the like, difficulty has hitherto been encountered in producing a mixture the temperature of which will remain substantially constant irrespective of changes in the temperatures, pressures and rates of flow of the fluids being mixed. Such mixers as are already known perform fairly satisfactorily as long as there are no substantial changes in the pressures and rates of flow of the various fluids supplied to the mixing device, but trouble is often experienced when such changes do occur because of the "hunting" action of the valves which permits alternate slugs of hot and cold fluids to pass through the mixer. Various methods have been suggested for remedying these defects, such as regulating both hot and cold fluid inlet valves from a single thermostat, using a small fixed orifice for one of the inlets and obtaining regulation by a valve in the other inlet, and using a pressure equalizer to maintain the pressures of the fluids supplied equal, but none of these remedies is adequate to produce the desired results under all of the various conditions encountered during practical operation.

It is therefore one of the objects of the present invention to provide a novel and efficient method and apparatus for mixing a plurality of fluids so as to produce a mixture the temperature of which is accurately maintained, within narrow limits, at a predetermined standard regardless of the differences and changes in the temperatures, pressures and rates of flow of the fluids being mixed.

Another object is to provide a new and improved method and apparatus for mixing a hot and a cold fluid so as to produce a fluid mixture of substantially constant temperature which utilize a separate inlet valve for each fluid but only a single thermostat, one valve being controlled directly by the thermostat and the other by the differential in pressure between the fluid controlled by the thermostat and the fluid mixture.

A further object is to provide a new and dependable method and apparatus for mixing a plurality of fluids so as to result in a fluid mixture of substantially constant temperature under all practical operating conditions, wherein the supply of the fluids to be mixed is controlled basically by the temperature of the mixture but which also include an automatic compensation of said basic control for variations in the inlet pressures and rates of flow of said fluids.

Still another object is to provide a method and apparatus for mixing a hot and a cold fluid so as to produce a fluid mixture the temperature of which will be maintained substantially constant at a predetermined standard, wherein the supply of one of said fluids is thermostatically controlled by the temperature of the mixture, while the supply of the other fluid is directly responsive either to changes in the pressure of the fluid mixture, or to variations in the supply pressures of the hot and cold fluids themselves.

A still further object is to provide a fluid mixing device of novel construction wherein a plurality of fluids are conducted through a portion of said device in parallel streams without mixing and are then thoroughly mixed by reversing the flow of a portion of said fluids so as to produce a great turbulence.

Another object is to provide in a fluid mixing device of the type embodying a thermostatically controlled valve for governing the supply of fluid thereto, a thermostat of novel construction which quickly and positively initiates movement of said valve upon a change in the temperature of the surrounding medium and also controls continued movement of the valve in such a manner as to overcome its tendency to "hunt".

Another object is to provide a fluid mixing device of the character described which is simple and rugged in structure and has a minimum of moving parts, is economical to manufacture and maintain, and is efficient and reliable for the purpose intended.

These and other objects will appear more fully from a consideration of the detailed description of the invention which follows. Although only two embodiments of the present invention are described and illustrated in the accompanying drawings, it is to be expressly understood that these drawings are for the purpose of illustration only and are not to be construed as a definition of the limits of the invention, reference being had for this purpose to the appended claims.

In the drawings, wherein like reference characters indicate like parts throughout the several views:

Fig. 1 is a side elevation, with certain parts broken away, of a fluid mixing device the method of operation and the construction of which constitute one embodiment of the present invention;

Fig. 2 is a side elevation in section of one of the fluid supply valves and its presure responsive operating means indicated in Fig. 1, the diaphragm cover plate being shown turned through an angle of 90° in the interest of clarity;

Fig. 3 is an end view of another fluid mixing device embodying the present invention;

Fig. 4 is a sectional view taken substantially on line 4—4 of Fig. 3, with certain parts shown in full; and Fig. 5 is a fragmentary sectional view taken substantially on line 5—5 of Fig. 3.

Referring now to Figs. 1 and 2, there is shown therein a fluid mixing device to which are supplied a hot and a cold fluid and within which said fluids are so mixed as to produce a fluid mixture the temperature of which is maintained, within narrow limits, substantially constant at a predetermined standard regardless of the initial temperatures and pressures, and the rate of flow of the mixed fluid. Although each fluid supply line is provided with its individual valve, regulation of the supply of both fluids is controlled basically by a single thermostat which is adapted to actuate the valve in one of the supply lines, the other valve being controlled by the differential in pressure between the fluid in the line controlled by the thermostatically operated valve and the fluid mixture within the mixing device. Suitable means are also provided for always maintaining this differential equal to or greater than a predetermined minimum value in favor of the pressure of the fluid in the thermostatically controlled supply line, thereby making possible automatic compensation of the basic control for variations in the pressures and rates of flow of the hot and cold fluids.

The specific form of apparatus disclosed in Figs. 1 and 2, as exemplary of the present invention, comprises a water mixer of the type wherein cold water and a hot fluid, such as hot water or steam, are supplied to a mixing chamber wherein they are thoroughly mixed and the cold water is heated, the resulting mixture being maintained at a substantially constant temperature, the latter being determined by the use to which the mixture is put. As shown, the hot fluid is supplied from any suitable source through a pipe or conduit 6, and passes through a strainer 7, valve 8 and into the inner central tube 9 of a mixing nozzle 10 which is located within and adapted to discharge the mixture of hot and cold fluids into a substantially cylindrical mixing chamber 11. At the same time, cold water is supplied through a pipe or conduit 12 from any suitable source, and passes through a strainer 13, a valve 14 and into a branch pipe 15 of the mixing nozzle assembly, whence it is delivered to the interior of mixing nozzle 10 in the space surrounding central tube 9. The mixture of fluids may be withdrawn from mixing chamber 11 as desired, the outlet therefrom being shown as a pipe or conduit 16 connected to the top of said chamber and controlled by a suitable valve 17.

It is desirable that a substantial part of the mixing of the hot and cold fluids should take place in the mixing nozzle before the fluids pass into the large mixing chamber 11, and to this end mixing nozzle 10 is constructed in a novel manner so as to create great turbulence in the fluids supplied thereto just before they pass into mixing chamber 11. In the form shown, the mixing nozzle assembly is substantially Y-shaped, the two arms of the Y being provided with suitable flanges or other couplings for connection to the outlets from valves 8 and 14, and with suitable means, such as a flange 18, for securing the assembly to mixing chamber 11 adjacent the bottom thereof. Central tube 9, through which the hot fluid is supplied, is substantially coaxial with the cylindrical interior of mixing nozzle 10, and branch pipe 15 is connected adjacent the outer end of the mixing nozzle assembly in such a manner that the flow of the cold fluid supplied therethrough surrounds central tube 9 and becomes substantially coaxial therewith and with the interior of mixing nozzle 10. Since central tube 9 extends inwardly a substantial distance beyond the inlet from branch pipe 15, it is evident that, for a portion of the length of mixing nozzle 10, the hot and cold fluids flow in parallel streams but are prevented from mixing by the wall of central tube 9.

In order to increase the efficiency of the mixing within the portion of mixing nozzle 10 where the hot and cold fluids are in direct contact with one another, it is desirable that a substantial portion of the flowing fluids have its direction of flow abruptly reversed before leaving the mixing nozzle so as to produce great turbulence and a rapid and thorough mixing. To this end, the outlet openings 19 from the interior of mixing nozzle 10 into mixing chamber 11 are located about the periphery of said nozzle and intermediate the inner end of central tube 9 and the closed inner end wall 20 of the nozzle. With this construction, the major portion of the fluids supplied to mixing nozzle 10 through pipe 15 and central tube 9 flows axially the length of the nozzle and upon abutting end wall 20 has its direction of flow suddenly reversed thus causing extreme agitation of the fluids within the mixing nozzle adjacent the outlet orifices 19, and thereby effecting an intimate mixture of the hot and cold fluids before delivery into mixing chamber 11 where the mixing process is completed so as to result in a mixture of uniform temperature throughout.

The supply of both the hot and cold fluids to mixing nozzle 10 is controlled basically by a single thermostat, exposed to the temperature of the fluid mixture within chamber 11, which is suitably connected in a known manner so as to control the movements of valve 8 of the hot fluid supply line. As shown, a thermostat bulb 21, partially filled with a liquid having a low boiling point, is suitably supported, as by a gland 22 threaded into the wall of mixing chamber 11, at a point within the mixing chamber intermediate mixing nozzle 10 and outlet conduit 16, the interior of bulb 21 being connected through a tube 23 having flexible portions 24, if desired, to the interior of a suitable expansible and contractible member housed within a casing 25 which is supported by a framework 26, the latter in turn being mounted on top of the casing of valve 8. A movable wall of the expansible and contractible member housed in casing 25 is secured to the valve stem 27 of valve 8. When the low boiling point liquid within bulb 21 is vaporized by an increase in temperature of the surrounding fluid mixture within mixing chamber 11, the vapor enters the open end of tube 23, passes into the expansible and contractible member, and by expansion of the latter against the force of a suitable spring 28 moves valve stem 27 so as to close valve 8. Upon a decrease in the vapor pressure, due to a lowering of the temperature of the fluid mixture in mixing chamber 11, the expansible and contractible member contracts, aided by the force of spring 28, and reopens valve 8. Suitable means may be provided for adjusting the initial compression of spring 28 so as to predetermine the temperature within mixing chamber 11 which will operate valve 8, such as a nut member 29 against which the lower end of spring 28 bears, said nut member being threaded upon a spindle 30 carried by framework 26 within which valve stem 27 is freely slidable. Since this type of valve operating mechanism is old and well known in the art, it is unnecessary to describe it in further detail, and it will be understood that any other equivalent mechanism may be substituted for the specific form shown.

It will be noted in Fig. 1 that the end of tube 23 within bulb 21 is curved upwardly so that its open end is located above the level of the liquid within the bulb. In thermostatically operated valve devices of this character previously employed, the open end of the tube has been placed below the level of the liquid in the bulb so that a change in temperature forces the liquid itself into, or withdraws it from, the tube and the interior of the expansible and contractible member, this resulting in the valve being opened or closed very rapidly, and, because of its high sensitivity, rendering the valve subject to a "hunting" form of operation. By locating the open end of tube 23, in accordance with the present invention, above the level of the liquid in bulb 21, only vapor enters said tube and the expansible and contractible member, the result being that although the initial movement of the valve occurs just as positively and quickly as in the devices hitherto known, the continued movement of the valve to its open or closed position takes place more slowly, thus overcoming the tendency to "hunt". In order to insure that the thermostat is properly installed within mixing chamber 11 with the open end of tube 23 up, the outer end of bulb 21 or tube 23 may be provided with a suitable marking to indicate the position of the end of said tube within said bulb.

With this construction, it is evident that the movements of valve 8, which controls the supply of hot fluid to mixing nozzle 10 and mixing chamber 11, will vary in proportion to changes in the temperature of the fluid mixture surrounding bulb 21 of the thermostat. However, in order that the temperature of the fluid mixture within said chamber may be maintained substantially constant, within narrow limits, the supply of cold fluid to mixing nozzle 10 must also be controlled so as to result in this desired mixture temperature. Novel means have therefore been provided for controlling valve 14 in the cold fluid supply line without the necessity for another thermostatic element.

As shown in Fig. 2, the inlet passageway 31 to the interior of the casing of valve 14 is elbow-shaped so as to direct the incoming cold fluid downwardly against valve disc 32 which is supported in a disc holder 33 in position to valve the outlet end of passageway 31. Disc holder 33 has a downwardly depending flange 34 which is adapted to slidably engage the upper end of a substantially cylindrical cap member 35 threaded into the bottom of the casing of valve 14. A suitable spring 36 rests on the bottom of cap member 35 and exerts an upward thrust against the bottom of disc holder 33 so as to urge valve disc 32 toward the lower end of inlet passageway 31 and close the valve. The movable valve assembly, however, is also rigidly connected to a flexible diaphragm 37, which may be made of rubber or any other suitable flexible material, said diaphragm in turn being secured in place across the open top of the casing of valve 14 by a suitable cover plate or cap 38 which forms a pressure chamber 39 on top of diaphragm 37. Diaphragm 37 is provided with a central opening therein through which projects the upper threaded end 40 of a yoke 41 which passes around the wall of elbow-shaped inlet passage 31 and is provided at its lower end with an internally threaded annular portion 42 into which the upper end of disc holder 33 is threaded. Valve disc 32 is thus clamped between annular portion 42 of yoke 41 and disc holder 33. Suitable diaphragm washers 43 may be provided above and below diaphragm 37 surrounding the threaded projection 40 of yoke 41, and a suitable nut 44 is threaded on said projection to complete the assembly.

With this construction, it is evident that the position of valve disc 32 with respect to the lower or outlet end of inlet passageway 31 is governed by the position of diaphragm 37, which in turn depends upon the difference between, on the one hand, the pressure in chamber 39 on the upper side of said diaphragm plus the fluid pressure on valve disc 32, and, on the other hand, the fluid pressure on the under side of said diaphragm plus the fluid pressure exerted on the lower side of disc holder 33 and the upward force exerted by spring 36.

As shown in Figs. 1 and 2, pressure chamber 39 above diaphragm 37 is connected by a suitable tube or conduit 45 with the outlet side of strainer 7 in the hot fluid line, and is hence subject to the pressure of the hot fluid on the supply side of valve 8, a pressure which is somewhat higher than that on the discharge side of the hot fluid valve and in mixing chamber 11. The pressure on the under side of diaphragm 37 is that of the cold fluid within the casing of valve 14 on the discharge side thereof, which pressure, neglecting the loss in pipe 15 to which the outlet from valve 14 is connected, is substantially the same as that of the mixture within mixing nozzle 10 and mixing chamber 11. Therefore, since spring 36 exerts a substantially constant upward force, and since the difference between the downward force on valve disc 32 and the upward force on disc holder 33 is comparatively small, the position of valve disc 32 of valve 14 may be said to be dependent upon the differential of pressure between the fluid on the top of diaphragm 37 and that below diaphragm 37; that is, the difference between the pressure of the hot fluid on the supply side of thermostatically operated valve 8 and the pressure of the fluid mixture within mixing chamber 11. It is preferable that the force exerted by spring 36 be so adjusted, as by threading cap 35 into or out of the valve casing, that this differential may never decrease below a predetermined amount, approximately three pounds in a water mixer of the type illustrated, although it will be understood that this differential may increase above this predetermined minimum under various conditions of pressure in the hot and cold fluid supply lines.

It is also preferable to so proportion the areas of diaphragm 37 and valve disc 32 relative to each other and to the strength of spring 36 that, in the event of a failure of the hot fluid supply, valve disc 32 will be forced to its seat by spring 36 with sufficient power to entirely shut off the cold fluid also.

The manner of operation of the mixing device just described, which is exemplary of the novel method provided by the present invention, may be summarized as follows: Assuming that both hot and cold fluids are being supplied to mixing nozzle 10 and thence to mixing chamber 11 in the proper proportions to maintain the mixture at the desired predetermined temperature, and that the mixture is being withdrawn from mixing chamber 11 through conduit 16, valve 17 being open, any slight change in the temperature of the mixture due to a change in the temperature, pressure or rate of flow of either of the fluids being supplied, promptly affects the thermostat so as to slightly open or close the hot fluid valve 8.

Assuming that the change in temperature of the mixture is a slight increase, the effect of the thermostat is to slightly close valve 8 so as to decrease the amount of hot fluid entering mixing nozzle 10, which closing of the valve simultaneously slightly decreases the pressure of the mixture. The effect of this pressure change is to increase the differential of pressure in favor of the pressure exerted on the top of diaphragm 37 so as to move yoke 41 downwardly, carrying with it valve disc 32, and thereby further open the cold fluid valve so that more cold fluid may flow to the mixing chamber to bring the temperature of the mixture back down to the predetermined standard. On the other hand, assuming that the change in temperature of the mixture is a slight decrease below the standard, the thermostat operates to further open the hot fluid valve 8, which opening of the valve simultaneously increases the pressure of the fluid mixture. The differential of pressure affecting diaphragm 37 is accordingly decreased and valve disc 32 is moved closer to the lower end of cold fluid inlet 31, thereby decreasing the amount of cold fluid supplied to the mixing chamber, which in turn permits the temperature of the mixture to increase again to the standard.

The construction just described also permits automatic compensation of the basic control afforded by the thermostat, whenever the supply pressures or rates of flow of the hot and cold fluids vary. For example, assuming that the supply pressure in the hot fluid line increases, which would in turn tend to increase the amount of hot fluid supplied to the mixing chamber in proportion to the cold fluid, this increase in pressure is instantaneously transmitted to pressure chamber 39 on top of diaphragm 37 with the result that the cold fluid valve is opened slightly so as to admit a greater quantity of cold fluid to the mixing chamber to balance the increased supply of hot fluid. If, on the other hand, the cold fluid supply pressure should increase, the pressure exerted on the under side of diaphragm 37 would also instantaneously increase, thereby decreasing the differential of pressure thereon and slightly closing the cold fluid valve to compensate for the increase in pressure so as to maintain the amount of cold fluid supplied substantially constant. Any other variation which may occur in the temperatures, pressures and rates of flow of the fluids will be accompanied by a similar compensation which is effective to maintain the temperature of the fluid mixture substantially constant.

Referring now to Figs. 3, 4 and 5, there is disclosed therein another form of water mixing device constituting another embodiment of the present invention. Although the physical structure of this embodiment differs somewhat from that of the embodiment of Figs. 1 and 2, the principles and method of operation are the same. As shown, the mixing chamber 46 is provided by a substantially cylindrical casing 47 open at one end (the right end as viewed in Fig. 4), which opening is adapted to be closed by a combined fluid supply conduit and valve structure of novel form indicated generally at 48. This combined conduit and valve structure 48 is provided with a cold fluid inlet passageway 49, and a balanced double disc valve member 50 past which the cold fluid flows into a valve chamber 51, one side of which is formed by a flexible diaphragm 52, and thence through an elbow-shaped passageway 53 into a tube 54. Tube 54 is supported by structure 48 within the upper portion of mixing chamber 46 and extends transversely substantially the width of said mixing chamber, being provided adjacent its inner end wall with a plurality of peripheral outlets 55 through which the flow of the cold fluid is directed into the stream of the hot fluid. The hot fluid is in turn supplied from any suitable source to a valve 56 and thence, through a suitable opening 57 in the closed end wall of casing 47, to mixing chamber 46. Mounted in opening 57, and secured in any suitable manner to casing 47, is an outer tube or shield member 58 which almost entirely surrounds tube 54 and forms therewith the equivalent of a mixing nozzle such as that disclosed in Fig. 1. The lower portion of outer tube or shield member 58 is cut away on a plane angularly disposed to the horizontal, as indicated in the broken lines in Fig. 3, so as to provide an opening through which the turbulently mixed fluids may be directed angularly downward into mixing chamber 46. To facilitate mixing and to insure higher velocity of the mixed fluid directly over the bulb 61, there is provided, preferably formed integral with casing 47, a suitably shaped baffle plate 59, the general shape of which is best shown in Fig. 3 in broken lines. The discharge opening 60 from mixing chamber 46 may be located at any suitable point, preferably at the top, of the periphery of casing 47.

Hot fluid valve 56 is opened and closed by the action of a suitable thermostat including a bulb 61 and an expansible and contractible member housed in casing 62 and connected to the bulb 61 by a tube 63, in a manner similar to that described in connection with the embodiment of Figs. 1 and 2. Likewise, cold fluid valve 50 is operated by the differential of pressure between the hot fluid on the supply side of valve 56, which pressure is conducted through a suitable tube 64, passageway 65 in casing 47, and tube elbow 66 (Fig. 5) to a chamber 67 between the top of diaphragm 52 and diaphragm cover plate or cap 68, and the fluid in valve chamber 51 plus the force of a spring 69 which is exerted against valve 50 in a direction tending to close the same, neglecting the very small force tending to open the valve due to the fluid pressure in passageway 49, less the fluid pressure in chamber 51 acting on the unbalanced area of valve 50.

As stated above, the control of hot fluid valve 56 by thermostat 61, and of cold fluid valve 50 by the differential of pressure exerted on diaphragm 52, and the automatic compensation of this basic control for variations in the pressure and rate of flow conditions of the fluids supplied to the mixing chamber, are based upon the same principles and operate in the same manner as previously described in connection with the embodiment of Figs. 1 and 2.

There is thus provided by the present invention a novel method and apparatus for controlling the mixing of a plurality of fluids in such a manner as to produce a mixture the temperature of which will remain substantially constant, within narrow limits, at a predetermined figure regardless of variations in the initial temperatures and pressures, or the rate of flow of the mixed fluid which is supplied by the mixer. Accurate and dependable operation is assured by the use of only a single thermostat which controls one of the inlet valves, the other inlet valve being in turn controlled by variations in the pressure of the fluid controlled by the thermostatically operated valve, of the fluid mixture, or both. The novel method and apparatus herein disclosed also provide for automatic compensation of the valve positions, as determined by the basic thermostatic control, in response to variations in the supply pressures and rates of flow of the fluids being mixed. Furthermore, in order that the structure of the mixing device provided by the present invention may be as simple and compact as possible, a novel form of mixing nozzle has also been provided which, by an abrupt change in the direction of flow of the fluids therethrough, produces a great turbulence and effects a rapid and thorough mixture of the fluids within a relatively constricted space. An improved form of thermostat has also been devised which tends to eliminate the "hunting" action formerly experienced with thermostatically operated valves heretofore known. All of these improvements have been embodied in a method and apparatus for the mixture of fluids which are highly efficient and dependable in practical operation, and capable of results not hitherto obtainable.

It will be obvious that the invention is not limited to the apparatus shown in the drawings, but is capable of a variety of mechanical embodiments. For example, any suitable type of thermostatically operated valve mechanism may be employed for controlling the movements of the hot fluid valve, and other forms of pressure responsive means may be substituted for the specific type of diaphragm described and illustrated in connection with the cold fluid valve. Also, it is obvious that the differential pressure operated valve can be used on the hot fluid supply line and an inverted thermostatic valve on the cold fluid line without deviating from the inventive concept. Moreover, although the description has referred to a water mixer in which hot and cold water are the two fluids to be mixed, it is evident that the method and apparatus are equally well adapted for use with other fluids, such as air or steam, as well as water. Furthermore, some of the various features described may be used separately or in combination with other features within the scope of the invention.

Various other changes, which will now appear to those skilled in the art, may be made in the form, details of construction and arrangement of the parts without departing from the spirit of the invention, and reference is therefore to be had to the appended claims for a definition of the limits of the invention.

What is claimed is:

1. In a device for mixing fluids, a mixing chamber having an inlet for each of two fluids to be mixed, a fluid supply conduit connected to each of said inlets, means for controlling the flow of the fluid in one of said conduits in accordance with variations in the temperature of the mixture of fluids in said chamber, and means for controlling the flow of the fluid in the other of said conduits in accordance with variations in the difference between the pressure of the fluid in said first named conduit and the pressure of the mixture of the fluids in said chamber.

2. In a device for mixing fluids, a mixing chamber having an inlet for each of two fluids to be mixed, a fluid supply conduit connected to each of said inlets, means for controlling the flow of the fluid in one of said conduits in accordance with variations in the temperature of the mixture of fluids in said chamber, and means for controlling the flow of the fluid in the other of said conduits in accordance with variations in the pressure of the mixture of fluids in said chamber.

3. In a device for mixing fluids, a mixing chamber having an inlet for each of two fluids to be mixed, a fluid supply conduit connected to each of said inlets, means for controlling the flow of the fluid in one of said conduits in accordance with variations in the temperature of the mixture of fluids in said chamber, and means for controlling the flow of the fluid in the other of said conduits in accordance with variations in the difference between the pressure of the fluid in said first named conduit and the pressure of the mixture of the fluids in said chamber, said last named means including means for maintaining the pressure of the fluid in said second named conduit lower than the pressure of the fluid in said first named conduit.

4. In a device for mixing fluids, a mixing chamber having an inlet for each of two fluids to be mixed, a fluid supply conduit connected to each of said inlets, means for controlling the flow of the fluid in one of said conduits in accordance with variations in the temperature of the mixture of fluids in said chamber, and means for controlling the flow of the fluid in the other of said conduits in accordance with variations in the pressure of the mixture of fluids in said chamber, said last named means including means for maintaining the pressure of the fluid in said second named conduit lower than the pressure of the fluid in said first named conduit.

5. In a device for mixing fluids, a mixing chamber having an inlet for each of two fluids to be mixed, a fluid supply conduit connected to each of said inlets, means responsive to variations in the temperature of the mixture of fluids in said chamber for controlling the flow of the fluid in one of said conduits only, and means responsive to variations in the difference between the pressure of the fluid in said first named conduit and the pressure of the mixture of fluids in said chamber for controlling the flow of the fluid in the other of said conduits.

6. In a device for mixing fluids, a mixing chamber having an inlet for each of two fluids to be mixed, a fluid supply conduit connected to each of said inlets, means responsive to variations in the temperature of the mixture of fluids in said chamber for controlling the flow of the fluid in one of said conduits only, and means responsive to variations in the pressure of the mixture of fluids in said chamber for controlling the flow of the fluid in the other of said conduits.

7. In a device for mixing fluids, a mixing chamber having an inlet for each of two fluids to be mixed, a fluid supply conduit connected to each of said inlets, a valve in each of said conduits, each of said valves being operable independently of the other, means responsive to variations in the temperature of the mixture of fluids in said chamber for controlling the position of one of said valves, and means responsive to variations in the difference between the pressure of the fluid in the conduit on the supply side of said first named valve and the pressure of the mixture of fluids in said chamber for controlling the position of the other of said valves.

8. In a device for mixing fluids, a mixing chamber having an inlet for each of two fluids to be mixed, a fluid supply conduit connected to each of said inlets, a valve in each of said conduits, each of said valves being operable independently of the other, a thermostat subject to the temperature of the mixture of fluids in said chamber and operatively connected to one of said valves for controlling the position thereof, and means responsive to variations in the pressure of the mixture of fluids in said chamber for controlling the position of the other of said valves.

9. The method of controlling the mixture of two fluids of different temperatures in a mixing chamber so as to maintain the mixture at a substantially constant predetermined temperature comprising varying the flow of one of said fluids to said mixing chamber in proportion to variations in the temperature of the mixture from the predetermined standard, and varying the flow of the other of said fluids in proportion to variations in the difference between the fluid pressure of the first named fluid and the fluid pressure of said mixture.

10. The method of controlling the mixture of two fluids of different temperatures in a mixing chamber so as to maintain the mixture at a substantially constant predetermined temperature comprising varying the flow of one of said fluids to said mixing chamber in proportion to variations in the temperature of the mixture from the predetermined standard, and varying the flow of the other of said fluids in proportion to variations in the fluid pressure of said mixture.

11. A method of controlling the mixture of two fluids of different temperatures in a mixing chamber so as to maintain the mixture at a substantially constant predetermined temperature including adjusting the flow of one of said fluids to said mixing chamber in accordance with the temperature of the mixture of fluids therein, adjusting the flow of the other of said fluids in accordance with the differential of pressure between the first named fluid and the mixture, and compensating the adjustment of the flow of either fluid in proportion to variations in the pressure and rate of flow of the other of said fluids.

12. In a device for mixing fluids of the type having a mixing chamber and a thermostatically controlled valve for controlling the flow of fluid thereto, temperature responsive means for actuating said valve including a pressure responsive expansible and contractible member operatively connected to said valve, a bulb containing a supply of liquid of low boiling point and so located as to be exposed to the temperature of the fluid in said mixing chamber, and conduit means connecting the interior of said bulb with said pressure responsive member, said conduit means being so connected to said bulb that only the vapor of said low boiling liquid may enter said conduit.

LLOYD L. DAVIES.
JULES V. RESEK.
WILLIAM W. CARSON, JR.